United States Patent
Lee et al.

(10) Patent No.: US 11,137,335 B2
(45) Date of Patent: Oct. 5, 2021

(54) METHOD FOR EVALUATING FLUID FLOW CHARACTERISTICS OF LENS-FREE CMOS OPTICAL ARRAY SENSOR PACKAGE MODULE HAVING FLOW CHANNEL

(71) Applicant: SOL INC., Seoul (KR)

(72) Inventors: Jong Muk Lee, Seoul (KR); Seong Won Kwon, Boeun-gun (KR); Ki Ho Jang, Seongnam-si (KR); Jung Joon Ahn, Uijeongbu-si (KR); Tae Young Lee, Asan-si (KR)

(73) Assignee: SOL INC., Seoul (KR)

( * ) Notice: Subject to any disclaimer, the term of this patent is extended or adjusted under 35 U.S.C. 154(b) by 294 days.

(21) Appl. No.: 16/338,064

(22) PCT Filed: Sep. 29, 2017

(86) PCT No.: PCT/KR2017/011031
§ 371 (c)(1),
(2) Date: Mar. 29, 2019

(87) PCT Pub. No.: WO2018/062963
PCT Pub. Date: Apr. 5, 2018

(65) Prior Publication Data
US 2019/0234858 A1   Aug. 1, 2019

(30) Foreign Application Priority Data

Sep. 30, 2016 (KR) .................. 10-2016-0126713
Aug. 23, 2017 (KR) .................. 10-2017-0106809

(51) Int. Cl.
*G01N 15/08*   (2006.01)
*H04N 5/374*   (2011.01)
(Continued)

(52) U.S. Cl.
CPC ........... *G01N 15/0826* (2013.01); *G01F 1/00* (2013.01); *G01N 15/08* (2013.01); *G01N 21/17* (2013.01);
(Continued)

(58) Field of Classification Search
CPC .. G01N 15/0826; G01N 15/08; G01N 27/414; G01N 21/17; G01N 2015/086;
(Continued)

(56) References Cited

U.S. PATENT DOCUMENTS

2007/0086918 A1* 4/2007 Hartley .............. G01N 15/1484
422/73
2015/0338334 A1* 11/2015 Lewis ................ G01N 15/1429
382/133
2016/0041094 A1* 2/2016 Lei ..................... G01N 15/1436
250/573

FOREIGN PATENT DOCUMENTS

KR     20140065589        5/2014
KR     20140065589 A  *  5/2014
(Continued)

OTHER PUBLICATIONS

KR-20140065589-A_ English Translation (Year: 2014).*
(Continued)

*Primary Examiner* — Natalie Huls
*Assistant Examiner* — Michael J Singletary
(74) *Attorney, Agent, or Firm* — Studebaker & Brackett PC

(57) ABSTRACT

Provided is a method for evaluating fluid flow characteristics of a lens-free complementary metal-oxide semiconductor (CMOS) optical sensor package module with a flow channel. The method includes: measuring a propagation profile and a flow velocity in an initial state flow of a fluid in the flow channel; calculating a first statistical parameter relating
(Continued)

to flow characteristics of the fluid from the measured propagation profile and flow velocity; and comparing the calculated first statistical parameter with a preset reference value and evaluating quality of the flow channel according to the comparison result.

12 Claims, 15 Drawing Sheets

(51) Int. Cl.
    *G01N 27/414* (2006.01)
    *G01N 21/17* (2006.01)
    *G01F 1/00* (2006.01)
    *G06F 17/16* (2006.01)
    *G06F 17/18* (2006.01)
    *G01N 21/84* (2006.01)

(52) U.S. Cl.
    CPC ........... *G01N 27/414* (2013.01); *G06F 17/16* (2013.01); *G06F 17/18* (2013.01); *H04N 5/374* (2013.01); *G01N 2015/086* (2013.01); *G01N 2021/8444* (2013.01)

(58) Field of Classification Search
    CPC ........... G01N 2021/8444; G01N 21/85; G01N 21/274; G06F 17/18; G06F 17/16; G01F 1/00; G01F 1/7086; G01F 1/704; H04N 5/374

See application file for complete search history.

(56) References Cited

FOREIGN PATENT DOCUMENTS

| | | | | |
|---|---|---|---|---|
| KR | 20150058562 | | 5/2015 | |
| KR | 20150058562 A | * | 5/2015 | ......... A61B 10/0045 |
| KR | 20160144692 | | 12/2016 | |
| KR | 20170077472 | | 7/2017 | |

OTHER PUBLICATIONS

KR-20150058562-A_English Translation (Year: 2015).*
International Search Report—PCT/KR2017/011031 dated Jan. 26, 2018.

* cited by examiner

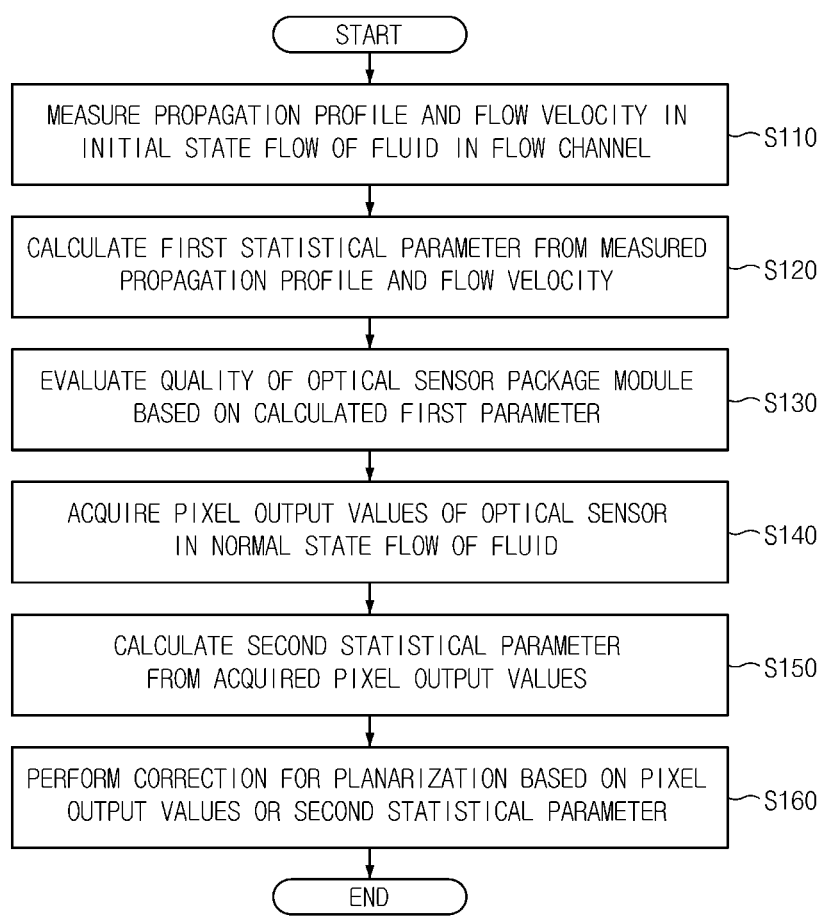

METHOD FOR EVALUATING FLUID FLOW CHARACTERISTICS OF LENS-FREE CMOS OPTICAL ARRAY SENSOR PACKAGE MODULE HAVING FLOW CHANNEL

TECHNICAL FIELD

This invention relates to semiconductor biosensor technology and more particularly, to a technology for evaluating fluid flow characteristics in a lens-free complementary metal-oxide semiconductor (CMOS) optical array sensor package module with a fluidic system.

BACKGROUND ART

Recently, with the development of sensor technology, each optical sensor array without an external optical lens unit is being used as a measuring instrument more frequently. In particular, optical sensor arrays are used in a bio-photoreaction measuring instrument, a lens-free microscope, an in-vitro diagnostic instrument using photoreaction measurement of immunochromatography, a multiplexing instrument for deoxyribonucleic acid (DNA) analysis, a bio-signal measuring instrument for healthcare, an implantable or patch-type medical measuring instrument, and the like.

PRIOR ART LITERATURE

Patent Literature

Korean Unexamined Patent Application Publication No. 10-2016-0144692 (Dec. 19, 2016)
Korean Unexamined Patent Application Publication No. 10-2017-0077472 (Jul. 6, 2017)

SUMMARY OF INVENTION

Technical Problem

The present invention is directed to providing a method of evaluating fluid flow characteristics of a lens-free complementary metal-oxide semiconductor (CMOS) optical sensor package module with a fluidic system.

Solution to Problem

One aspect of the present invention provides a method of evaluating fluid flow characteristics of a lens-free complementary metal-oxide semiconductor (CMOS) optical sensor package module with a fluidic system, the method including: measuring a propagation profile and a flow velocity in an initial state flow of a fluid in the flow channel; calculating a first statistical parameter relating to flow characteristics of the fluid from the measured propagation profile and flow velocity; and comparing the calculated first statistical parameter with a preset reference value and evaluating quality of the flow channel according to the comparison result.

The method may further include: acquiring output values of respective pixels in a valid area of the optical sensor in a normal state flow of the fluid; calculating a second statistical parameter from the output values; and performing a correction for planarization on the basis of the output values or the second statistical parameter.

Advantageous Effects of Invention

According to the present invention, evaluations are separately made in an initial state and a normal state of a fluidic flow so that reliability of the evaluations may be improved. Also, it is possible to provide an evaluation reference relating to uniformity and safety of a flow channel using a propagation profile and a flow velocity of a fluid in a normal state flow.

BRIEF DESCRIPTION OF DRAWINGS

FIG. 8 is a flowchart illustrating a method of evaluating fluid flow characteristics of an optical sensor package module according to an embodiment of the present invention.

DETAILED DESCRIPTION OF EMBODIMENT

Figure 1:
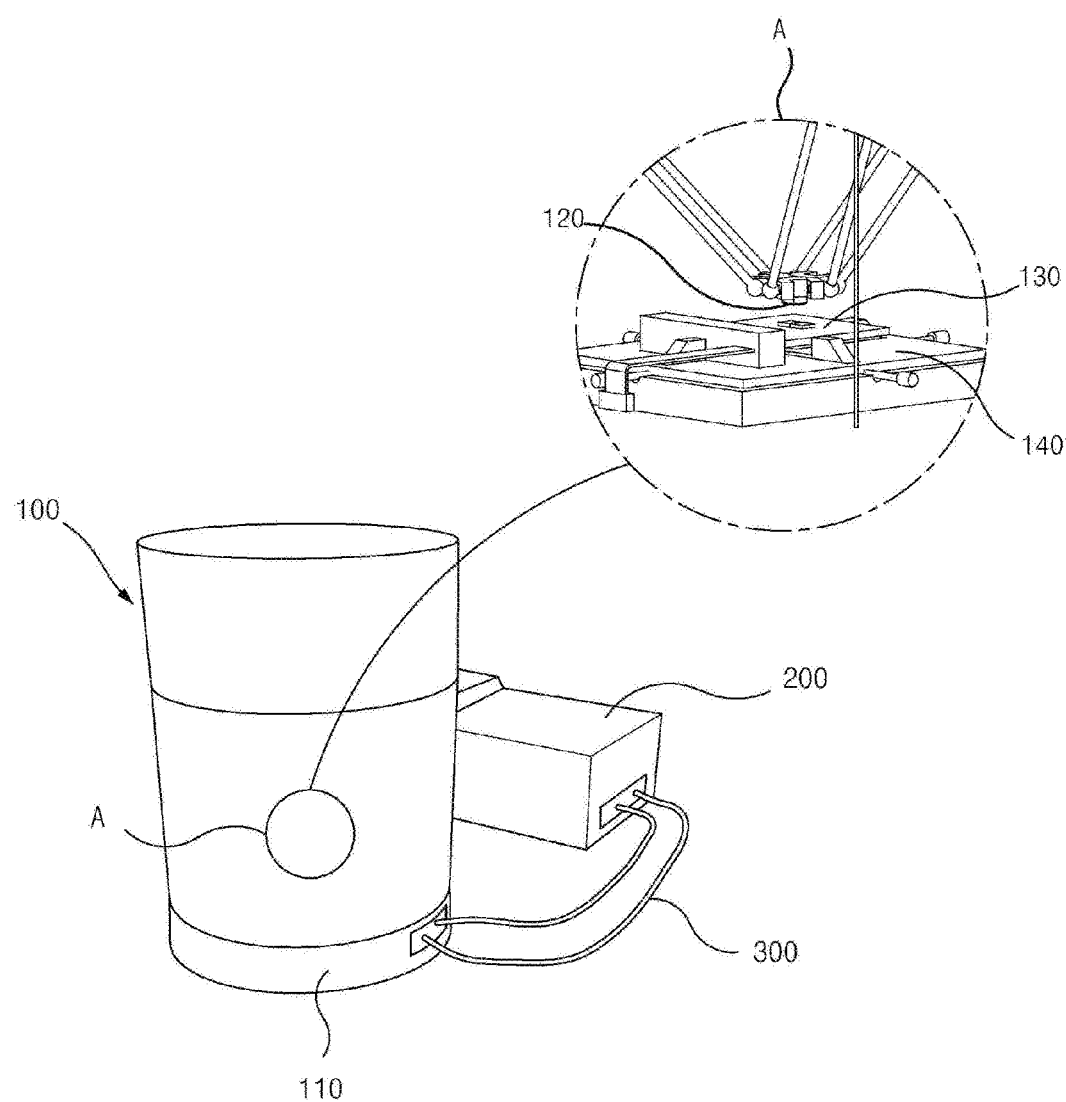
FIG. 1 is a configuration diagram of a system for evaluating fluid flow characteristics of an optical sensor package module according to an embodiment of the present invention.

Since embodiments of the present invention may be modified in various ways and may have several forms, the embodiments will be shown in the drawings and described in detail in this specification. However, the embodiments are not intended to limit the present invention to particular forms disclosed and include all changes, equivalents, or substitutes that do not depart from the spirit and technical scope of the present invention.

It is to be understood that when an element is referred to as being "connected" or "coupled" to another element, the element may be directly connected or coupled to the other element or an intermediate element may be present therebetween. Other words used to describe the relationship between elements, that is, "between," "adjacent," etc., should be interpreted in a like fashion.

Terminology used herein is for the purpose of describing particular embodiments only and is not intended to limit the present invention. The singular forms include the plural forms as well unless the context clearly indicates otherwise. It will be understood that the terms "include," "have," etc., when used herein, specify the presence of stated features, integers, steps, operations, elements, parts, or combinations thereof, but do not preclude the presence or addition of one or more features, integers, steps, operations, elements, parts, or combinations thereof.

Unless otherwise defined, all terms (including technical and scientific terms) used herein have the same meaning as commonly understood by those of ordinary skill in the art to which the present invention pertains. Terms, such as those defined in commonly-used dictionaries, should be interpreted as having a meaning which is consistent with their meaning in the context of the relevant art and will not be interpreted in an idealized or overly formal sense unless clearly so defined herein.

Hereinafter, embodiments of the present invention will be described in detail with reference to the accompanying drawings.

FIG. 1 is a configuration diagram of a system for evaluating fluid flow characteristics of an optical sensor package module according to an embodiment of the present invention. Referring to FIG. 1, the system for evaluating fluid flow characteristics of an optical sensor package module may include a measuring device 100, a computing device 200, and a cable 300 for data transmission between the measuring device 100 and the computing device 200.

The measuring device 100 may be an environment where entrance of ambient light is blocked through a darkroom box 110. Referring to the enlarged view of area A in FIG. 1, a light source 120, a sensor board 130, and a jig 140 may be included in the darkroom box 110. An optical sensor package module 400 may be electrically connected to the sensor board 130 thereon.

The computing device 200 may evaluate fluid flow characteristics of the optical sensor package module 400 on the basis of measured data transmitted from the measuring device 100 through the cable 300.

Figure 2:
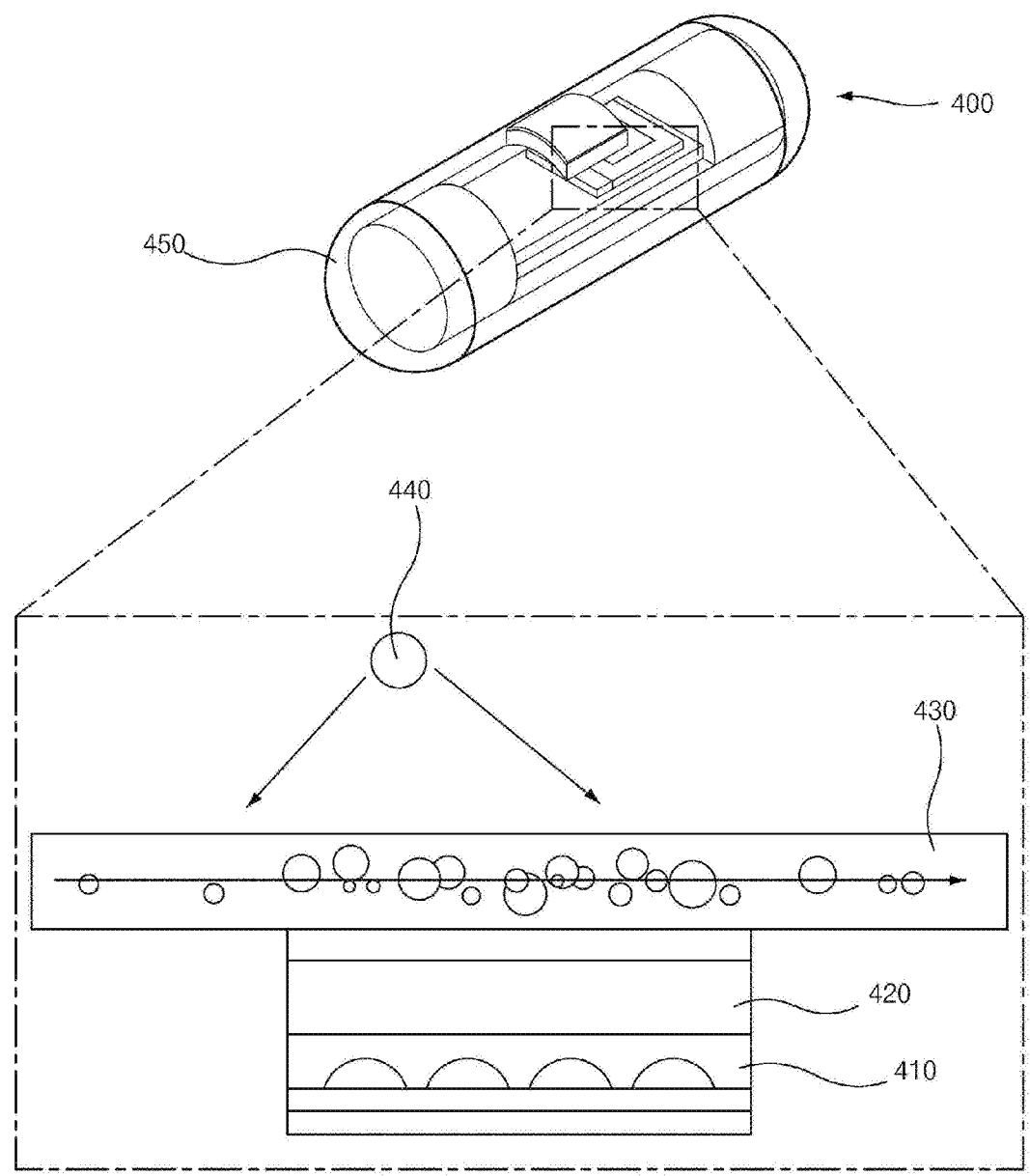
FIG. 2 is a cross-sectional view of an optical sensor package module according to an embodiment of the present invention.

FIG. 2 is a cross-sectional view of an optical sensor package module according to an embodiment of the present invention. Referring to FIG. 2, the optical sensor package module 400 may include an optical sensor 410, an intermediate layer 420, a fluidic system 430, an applied light source 440, and a darkroom capsule 450.

The optical sensor 410 may indicate a complementary metal-oxide semiconductor (CMOS) optical detector in which detection elements are arranged in two dimensions and integrated with a data processing circuit on a chip.

In particular, the optical sensor 410 does not have an external lens and has neither a mount structure nor a barrel structure for mounting an external lens. Therefore, a sensing environment of the optical sensor 410 differs from that of an image sensor for general use in which an external lens is generally installed on a module housing.

The intermediate layer 420 may be bonded onto the optical sensor 410 and composed of a plurality of layers, which may include a layer made of a medium between the optical sensor 410 and the fluidic system 430 and also both a reactive material layer and a physical space for transmitting light.

The fluidic system 430 is disposed on the optical sensor 410 and provides a passage in which a fluid (e.g., a buffer and a serum) may flow by force or due to a capillary phenomenon. According to an embodiment, the fluidic system 430 may be implemented as a flow channel such as a paper membrane strip, a gel matrix with pores, or a microchannel for biological detection.

The applied light source 440 is shown as a point light source in FIG. 2 but is not limited thereto. The applied light source 440 may be implemented in a surface light source structure.

Figure 3:
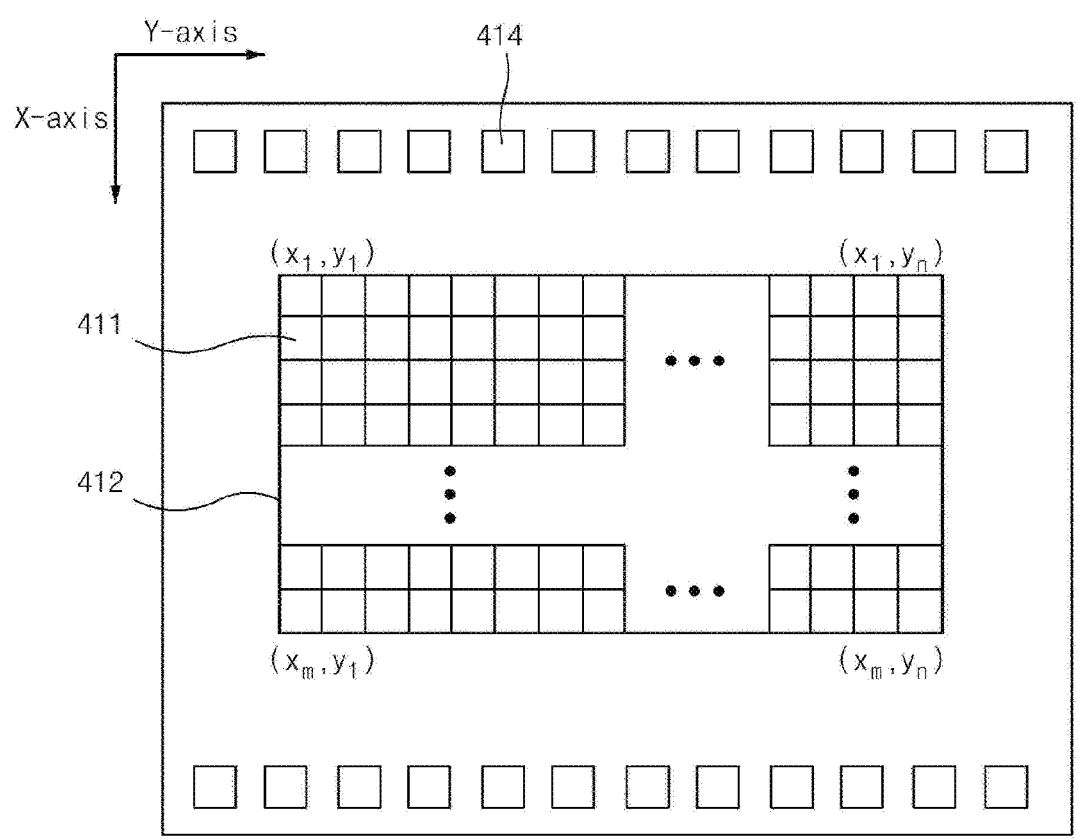
FIG. 3 is a top-down view of an optical sensor according to an embodiment of the present invention.

FIG. 3 is a top-down view of an optical sensor according to an embodiment of the present invention. Referring to FIG. 3, the optical sensor 410 includes a pixel array 412 and pads 414.

The pixel array 412 is a set of pixels in which a plurality of unit pixels 411 are arranged in x and y axes. The pixel array 412 may constitute a valid area composed of a fixed number (m*n) of pixels.

When a fluidic flow in the flow channel reaches the valid area of the pixel array 412, each pixel starts measuring light (e.g., a fluorescent signal) generated from a light source material (e.g., a fluorescent dye) included in the fluid. The valid area may indicate the whole or a part of the pixel array 412 as shown in FIG. 3.

In this case, a flow velocity in each column of the pixel array 412 may vary according to a fixed matrix characteristic of the flow channel (e.g., a pore size and the distribution of defects in a gel or paper matrix), and light signal distribution may be affected by the flow velocity in a fluid flow direction.

A fluidic flow may be classified into an initial state flow and a normal state flow. For example, when a fluidic flow reaches a final column yn of the pixel array 412, a light signal sensed by the optical sensor reaches a stable state in which the light signal is changed little. At this time, the fluidic flow is switched from the initial state flow to the normal state flow.

Figure 4A:
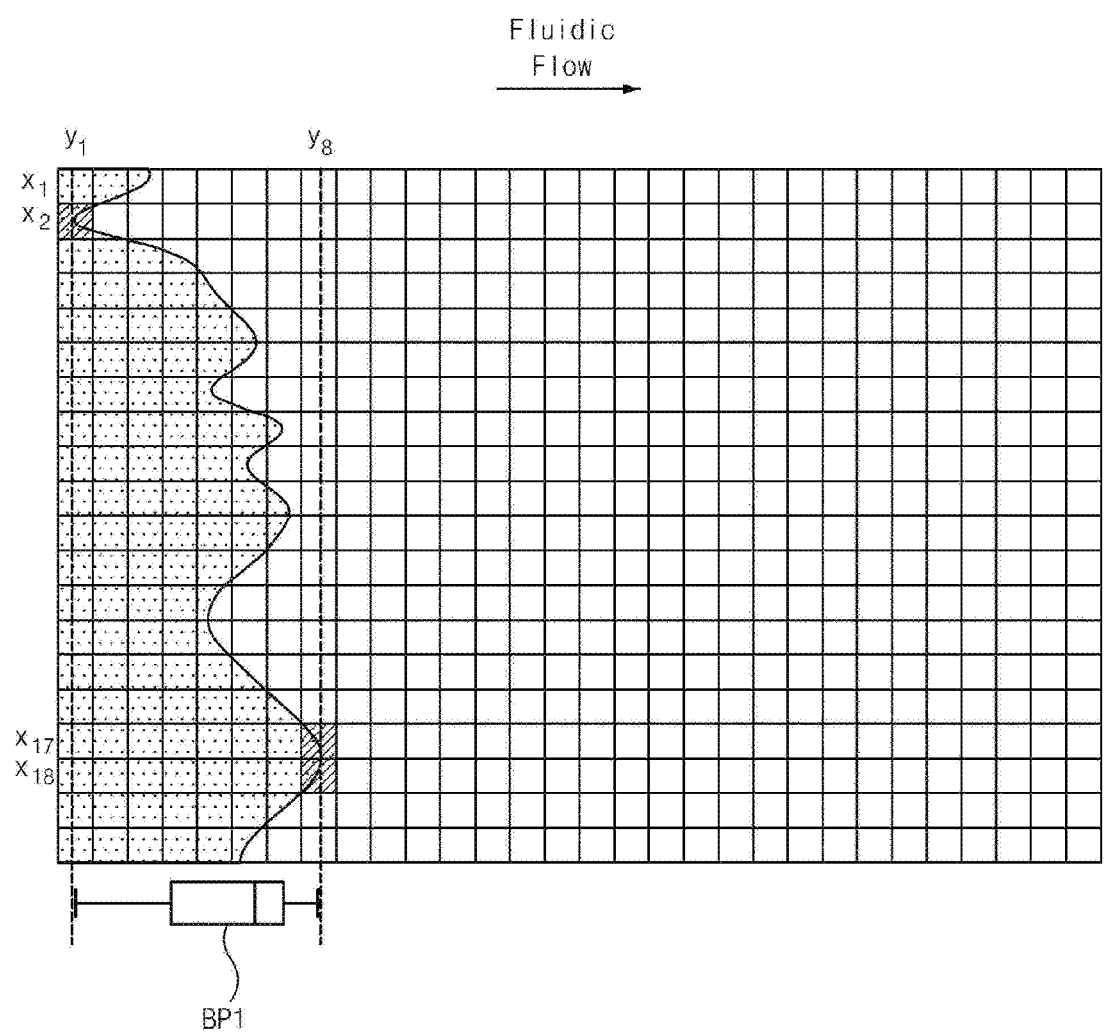
FIGS. 4A to 4C show propagation profiles of a fluid in an initial state flow according to an embodiment of the present invention.
Figure 4B:
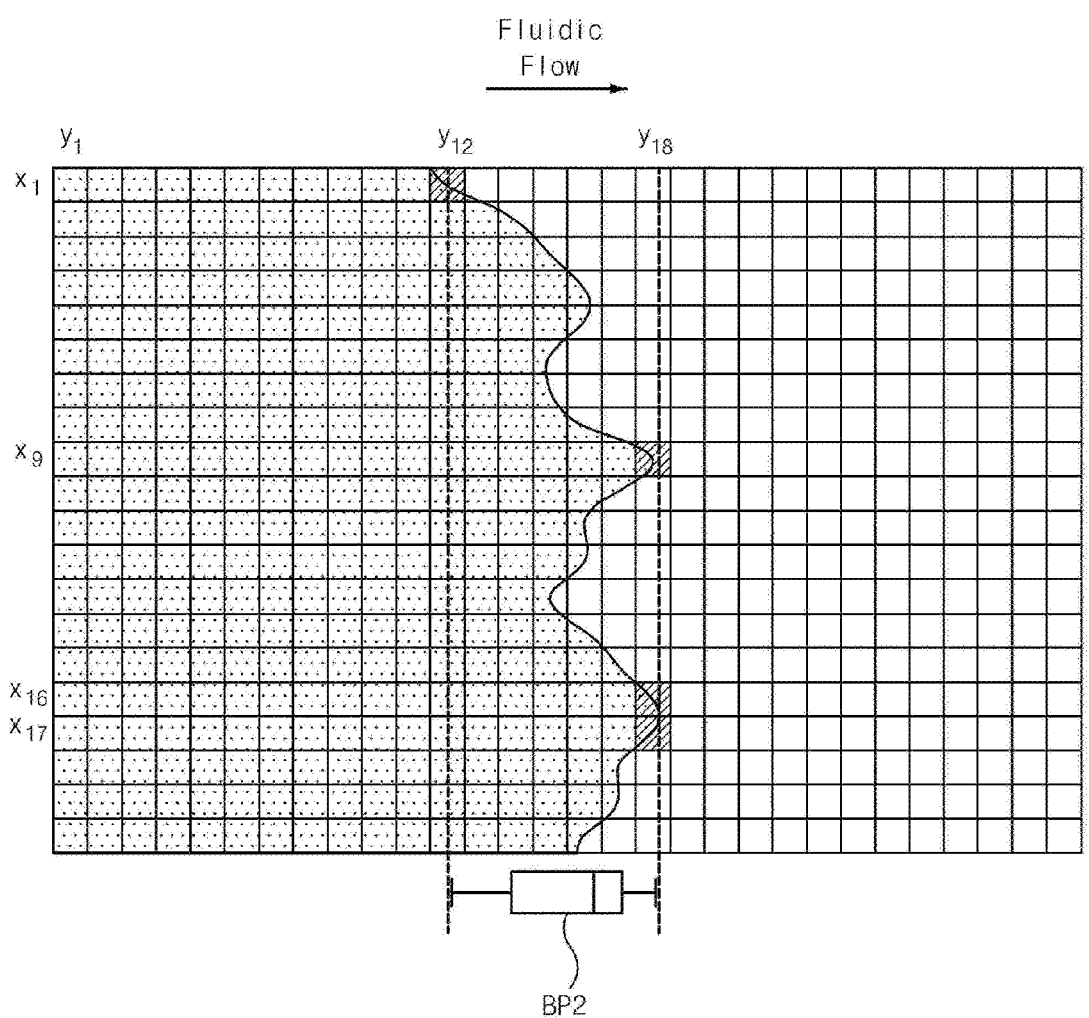
Figure 4C:
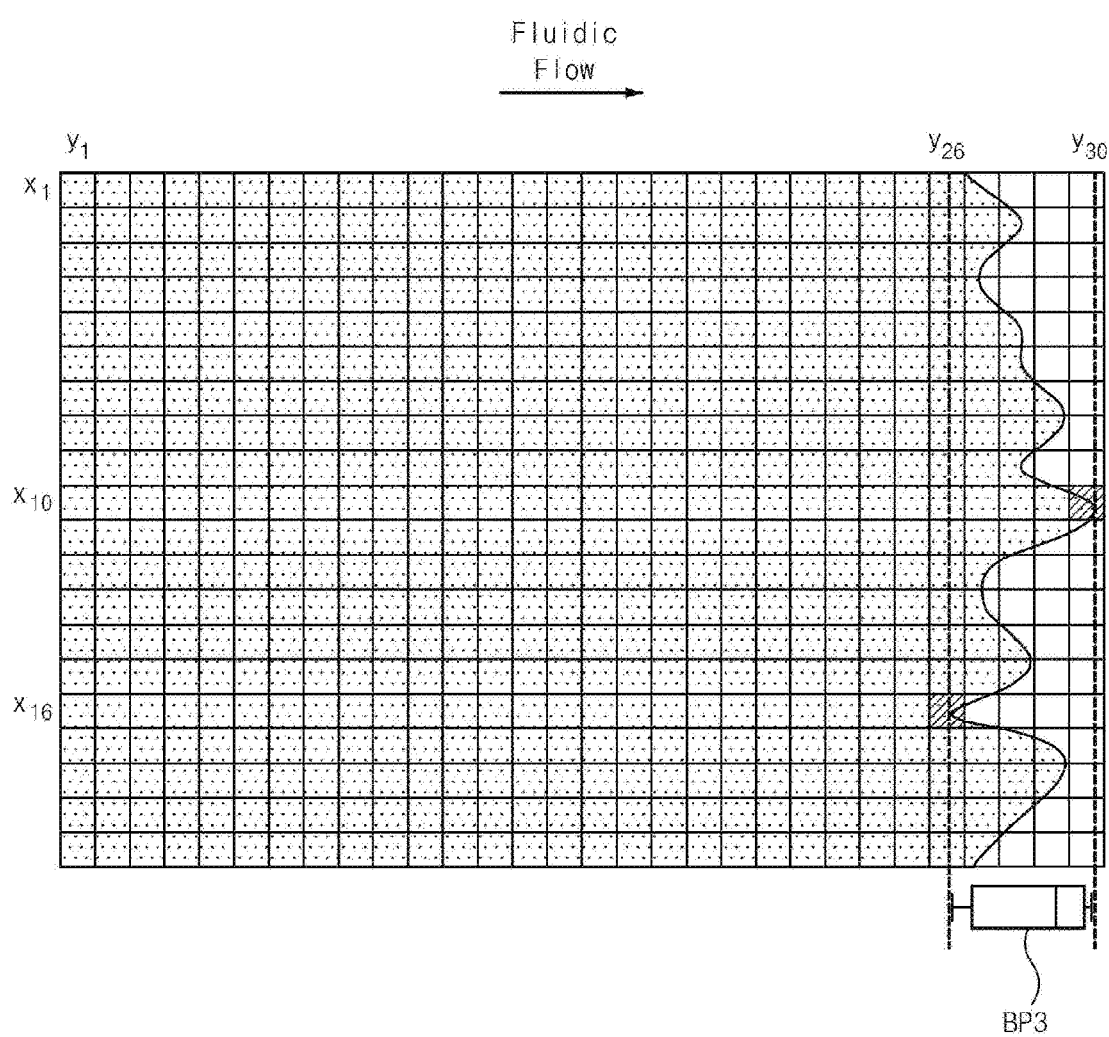

FIGS. 4A to 4C show propagation profiles of a fluid in an initial state flow according to an embodiment of the present invention.

Referring to FIGS. 4A to 4C, a fluid may flow in a horizontal direction (y axis) in the flow channel. The shape of a fluidic flow is continuously changed due to the fixed matrix characteristic of the flow channel.

Hereinafter, a two-dimensional shape of a fluidic flow seen from above at a specific point in time will be referred to as a "fluid flow propagation profile" or a "propagation profile" in short.

Together with a flow velocity of a fluid, a propagation profile may be major measured data for evaluating flow characteristics of the optical sensor package module. In other words, a propagation profile and a flow velocity are factors for evaluating how uniformly and stably the fluid flows in the flow channel.

A propagation profile is measured when a light signal is sensed in the pixel array 412 of the optical sensor 410. For example, in every frame, each pixel of the pixel array 412 senses light generated from a fluorescent material included in the fluid, converts the sensed light into an electrical signal, and outputs the electrical signal.

When an output value exceeds a preset threshold value, it is possible to determine that the fluid exists on the corresponding pixel. For reference, such a case in which it is determined that a fluid exists on each pixel is defined to be a "pixel-on state," and the opposing case is defined to be a "pixel-off state."

A determination on the pixel-on or -off state is simultaneously made for all pixels in the valid area, and it is possible to generate a propagation profile by distinguishing between pixels on which a fluid exists and other pixels according to determination results.

Since it is necessary to measure a propagation profile over the entire section of the flow channel, a propagation profile may be measured in each of at least three steps, that is, a beginning step, an intermediate step, and a final step of an initial state flow.

The beginning step of the initial state flow may be defined to be a time when a fluidic flow reaches the valid area of the pixel array 412 after the fluid initially starts flowing through the flow channel. For example, as shown in FIG. 4A, the beginning step may be determined to be a point in time when output values of all pixels in a first column y1 of the pixel array 412 exceed the preset threshold value, that is, when the pixel ($x_2$, $y_1$) is turned on.

The final step may be defined to be a time when the fluidic flow starts exceeding the valid area of the pixel area 412. For example, as shown in FIG. 4C, the final step may be determined to be a point in time when an output value of at least one pixel in a last column y30 exceeds the threshold value, that is, when the pixel ($x_{10}$, $y_{30}$) is turned on.

The intermediate step may be defined to be a time when the fluidic flow is between the beginning step and the final step. For example, as shown in FIG. 4B, the intermediate step may be determined to be a time when all pixels in an arbitrary intermediate column y12 in the valid area are turned on or at least one pixel in a column y18 is turned on.

In the initial state, the fluidic flow may be statistically analyzed using the generated propagation profile. In other words, a statistical parameter, such as a boxplot or a coefficient of variation (C.V) that represents a ratio of a standard deviation to a mean, may be calculated from the fluid flow propagation profile, and flow characteristics of the fluid may be evaluated on the basis of the statistical parameter.

A boxplot visually depicts a statistical value data group and may include a maximum, a minimum, a median, a mode, a mean, first and third quartiles, and the like. Also, a value obtained by adding noise to a mean may be displayed together.

Referring to FIG. 4A, distances that the fluid travels in respective rows in the initial step may differ from each other. For example, a last pixel to which the fluid has flowed in a first row x1 is positioned at P(1, 3), and a pixel distance is 3. However, in a 17th row x17, a last pixel is positioned at P(17, 8), and a pixel distance is 8.

A boxplot BP1 statistically shows such a propagation profile, that is, a travel distance of the fluid in the respective rows, of the initial step. In other words, the boxplot BP1 may show a minimum (min=1), a maximum (max=8), a median (median=6), a first quartile (Q1=4), a third quartile (Q3=7), etc. related to the travel distance of the fluid.

Referring to FIGS. 4B and 4C, even in the intermediate step and the final step, distance that the fluid travels in each row may differ from each other likewise, and it is possible to statistically analyze propagation profiles at the respective points in time through boxplots BP2 and BP3.

Figure 5A:
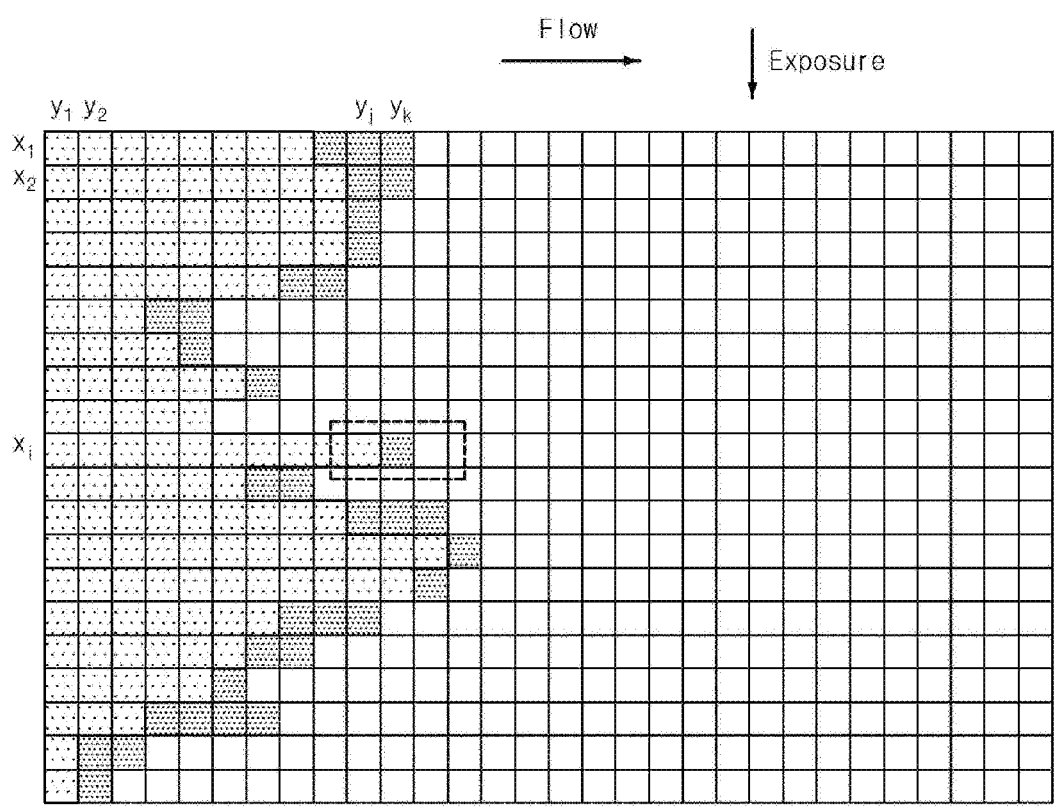
FIGS. 5A to 5C illustrate a method of calculating a flow velocity of a fluid in a global shutter method of an optical sensor according to an embodiment of the present invention.
Figure 5B:
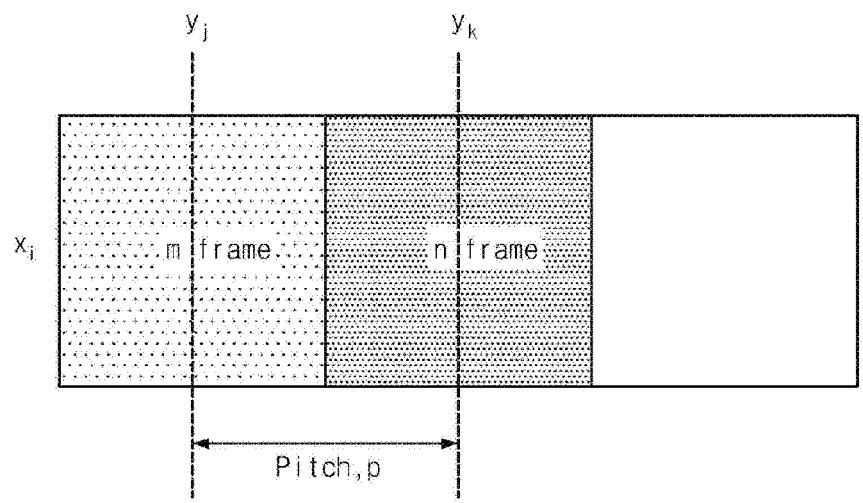
Figure 5C:
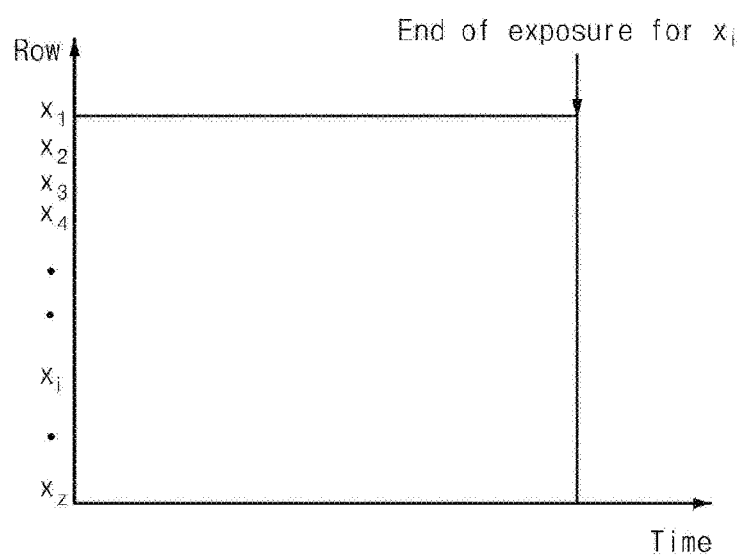

FIGS. 5A to 5C illustrate a method of calculating a flow velocity of a fluid in a global shutter method of an optical sensor according to an embodiment of the present invention.

Referring to FIGS. 5A to 5C, the optical sensor package module 400 may use the global shutter method, and a fluidic flow may move in a horizontal direction (i.e., a y-axis direction) in the flow channel. The global shutter method is a method of simultaneously exposing all the pixels for a certain period of time as shown in FIG. 5C.

A velocity $V_{G\_i}$ of the fluid flowing through the flow channel in the global shutter method may be calculated by Equation 1 below regardless of a flow direction of the fluid.

$$S_{G\_i}[m] = (Q_{ik} - Q_{ij}) * p$$

$$T_{G\_i}[s] = \frac{n-m}{FPS}$$

[Equation 1]

-continued $$V_{G\_i}[m/s] = \frac{S_{G\_i}}{T_{G\_i}} = \frac{Q_{ik} - Q_{ij}}{n-m} * p * FPS$$

Here, $S_{G\_i}$ and $T_{G\_i}$ respectively indicate a travel distance and a travel time of the fluid, and units thereof are [m] and [s]. There is a time interval between a point in time when the fluid actually flows over a pixel and a point in time when the flow is processed. However, the time interval is the same for all pixels and thus may be ignored for velocity calculation.

$Q_{ij}$ may be defined to be a position of a last pixel which exceeds the threshold value in the fluid flow direction in an $m^{th}$ frame (m>1) and may indicate a pixel corresponding to an $i^{th}$ row and a $j^{th}$ column.

Also, $Q_{ik}$ may be defined to be a position of a last pixel which exceeds the threshold value in the fluid flow direction in an $n^{th}$ frame (n>m) and may indicate a pixel corresponding to the $i^{th}$ row and a $k^{th}$ column (k>j). Also, p indicates the distance between pixels which are adjacent in the fluid flow direction, and FPS is a frame rate, that is, the number of frames per second.

In this way, it is possible to calculate a velocity in a last pixel of each row in each frame. When the fluid flows over several pixels in the following frame due to the high velocity, a velocity at an intermediate pixel may be determined by interpolation.

Meanwhile, velocities at pixels corresponding to the beginning step and the final step of the initial state may be inaccurate when the flow is rapid. Therefore, the flow of the intermediate step may be used to calculate a flow velocity of the fluid.

After the velocity of the fluidic flow is calculated, it is possible to determine the reliability of measurement and samples using a Reynolds number.

Figure 6A:
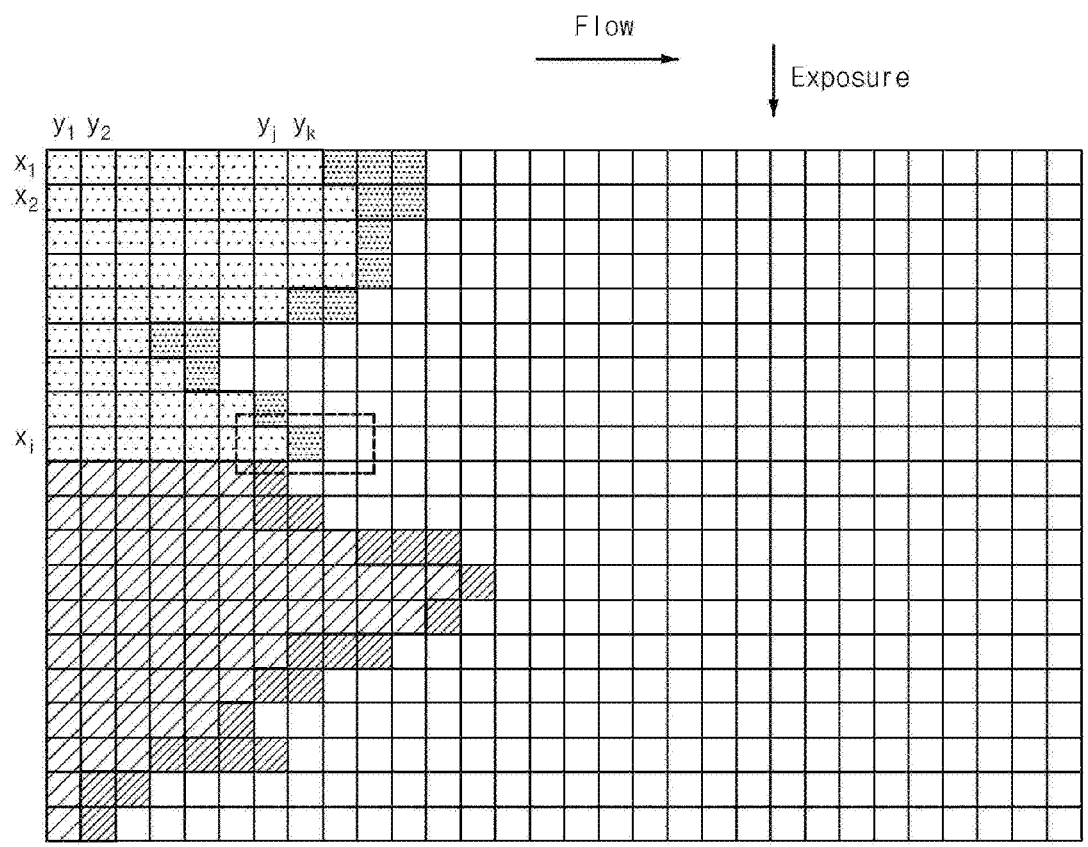
FIGS. 6A to 6C illustrate a method of calculating a horizontal flow velocity of a fluid in a rolling shutter method of an optical sensor according to an embodiment of the present invention.
Figure 6B:
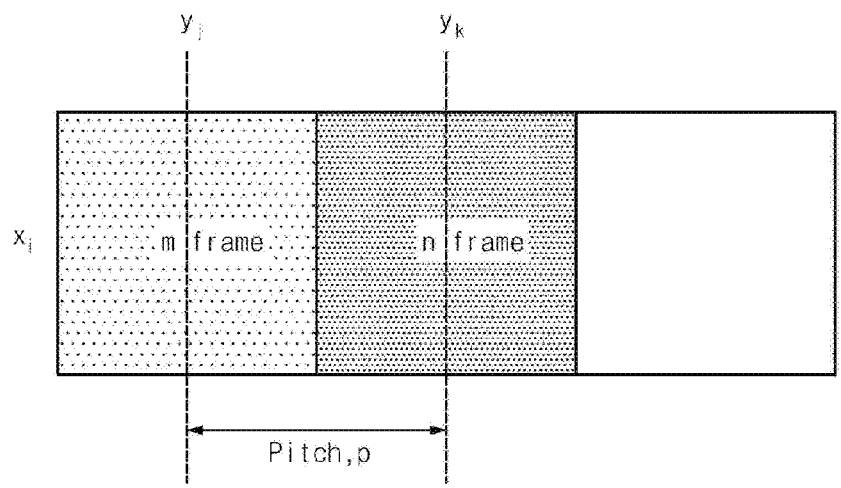
Figure 6C:
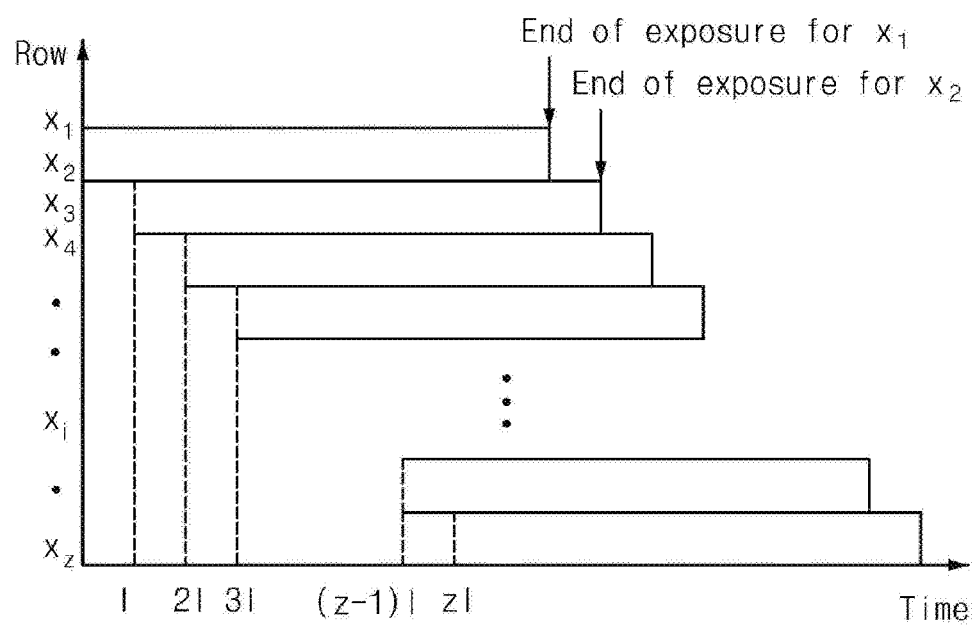

FIGS. 6A to 6C illustrate a method of calculating a horizontal flow velocity of a fluid in a rolling shutter method of an optical sensor according to an embodiment of the present invention.

Referring to FIGS. 6A to 6C, the optical sensor package module 400 may use the rolling shutter method, and the fluidic flow may move in the horizontal direction (i.e., the y-axis direction) in the flow channel.

The rolling shutter method is a method of sequentially exposing respective rows at regular time intervals I as shown in FIG. 6C. For example, after exposure of the first row x1 is started, the regular time interval I is followed by exposure of a second row x2. In this case, the time interval I may be referred to as a line time.

In the embodiment of FIG. 6A, however, a fluid flow direction is perpendicular to an exposure direction of the rolling shutter method. Therefore, calculating a flow velocity is not affected by the time interval I.

In the rolling shutter method, a fluid velocity $V_{R\text{-}H\_i}$ of a horizontal flow may be calculated by Equation 2 below.

$$S_{R-H\_i}[m] = (Q_{ik} - Q_{ij}) * p$$

$$T_{R-H\_i}[s] = \frac{n-m}{FPS}$$

$$V_{R-H\_i}[m/s] = \frac{S_{R-H\_i}}{T_{R-H\_i}} = \frac{Q_{ik} - Q_{ij}}{n-m} * p * FPS$$

[Equation 2]

Here, $S_{R\text{-}H\_i}$ and $T_{R\text{-}H\_i}$ respectively indicate a travel distance and a travel time of the fluid, and units thereof are [m] and [s].

$Q_{ij}$ may be defined to be a position of a last pixel which exceeds the threshold value in the fluid flow direction in an $m^{th}$ frame (m>1) and may indicate a pixel corresponding to an $i^{th}$ row and a $j^{th}$ column.

Also, $Q_{ik}$ may be defined to be a position of a last pixel which exceeds the threshold value in the fluid flow direction in an $n^{th}$ frame (n>m) and may indicate a pixel corresponding to the $i^{th}$ row and a $k^{th}$ column (k>j). Also, p indicates the distance between pixels which are adjacent in the fluid flow direction, and FPS is a frame rate, that is, the number of frames per second.

Figure 7A:
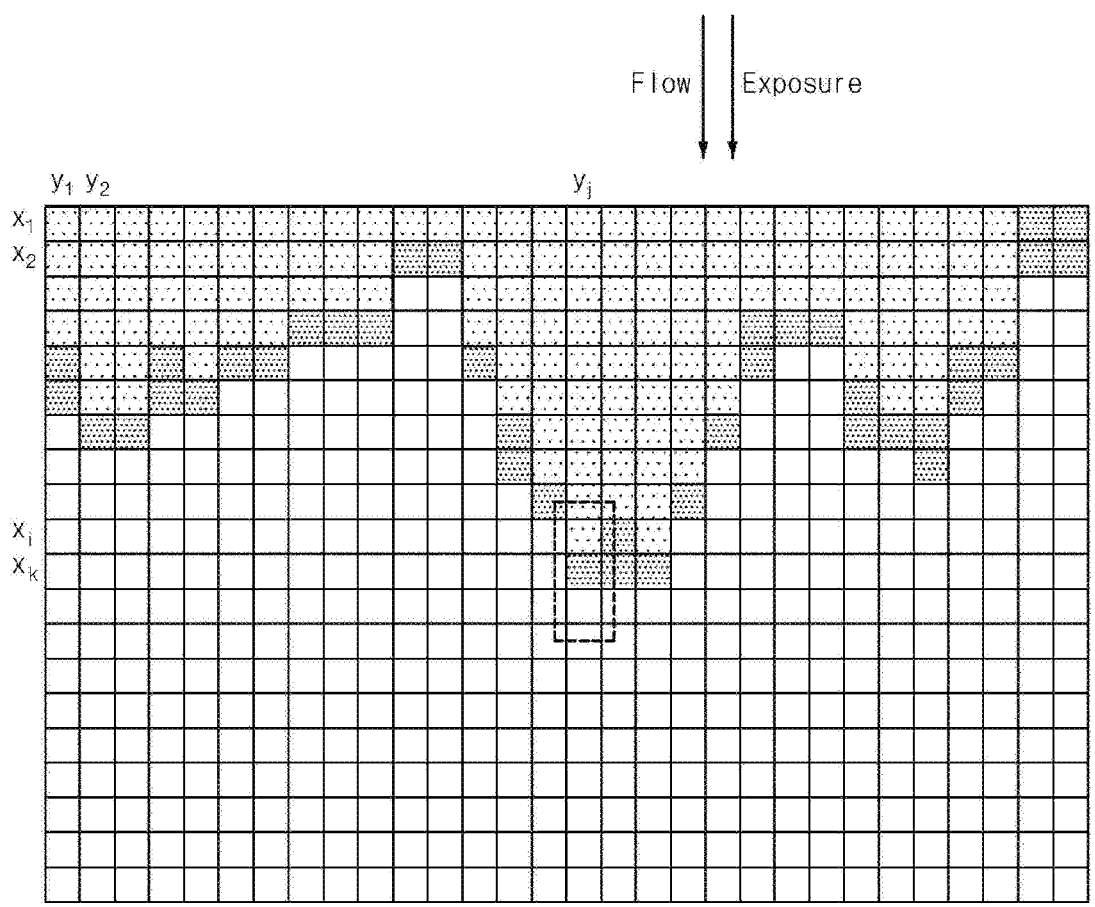
FIGS. 7A to 7C illustrate a method of calculating a vertical flow velocity of a fluid in the rolling shutter method of an optical sensor according to an embodiment of the present invention.
Figure 7B:
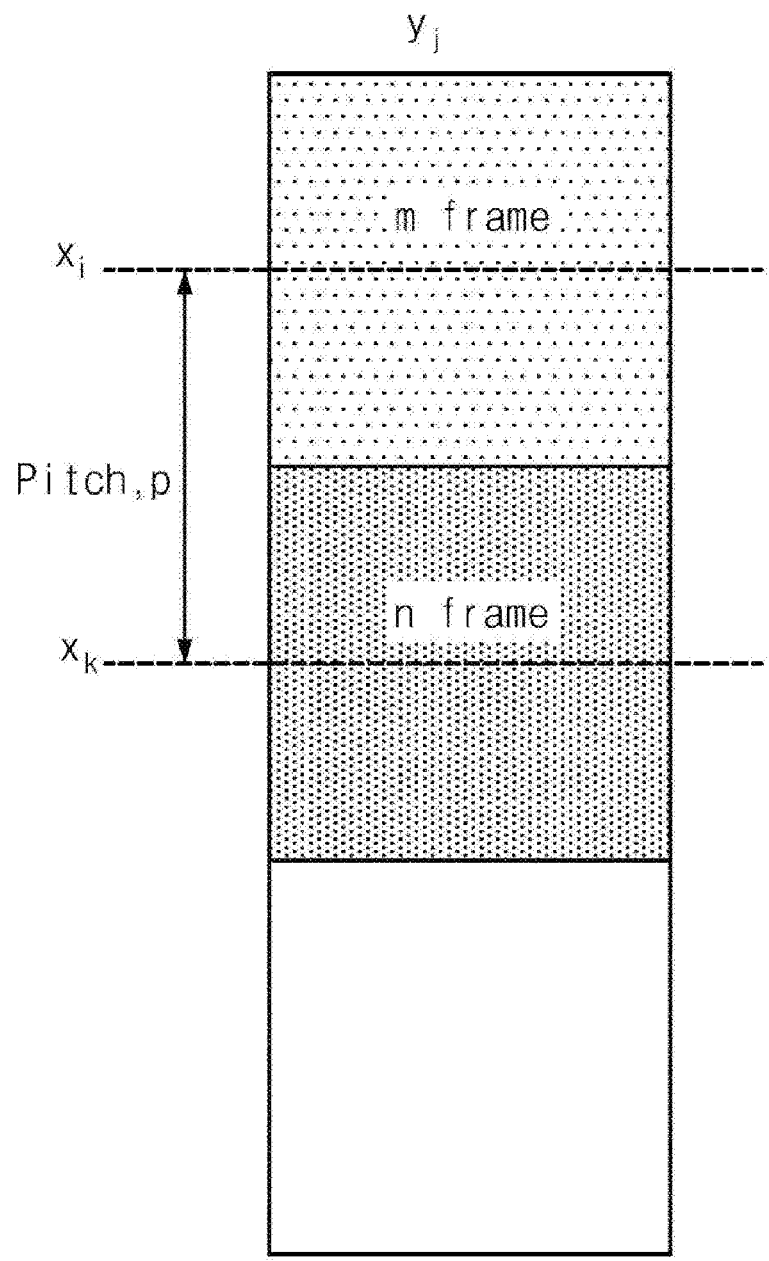
Figure 7C:
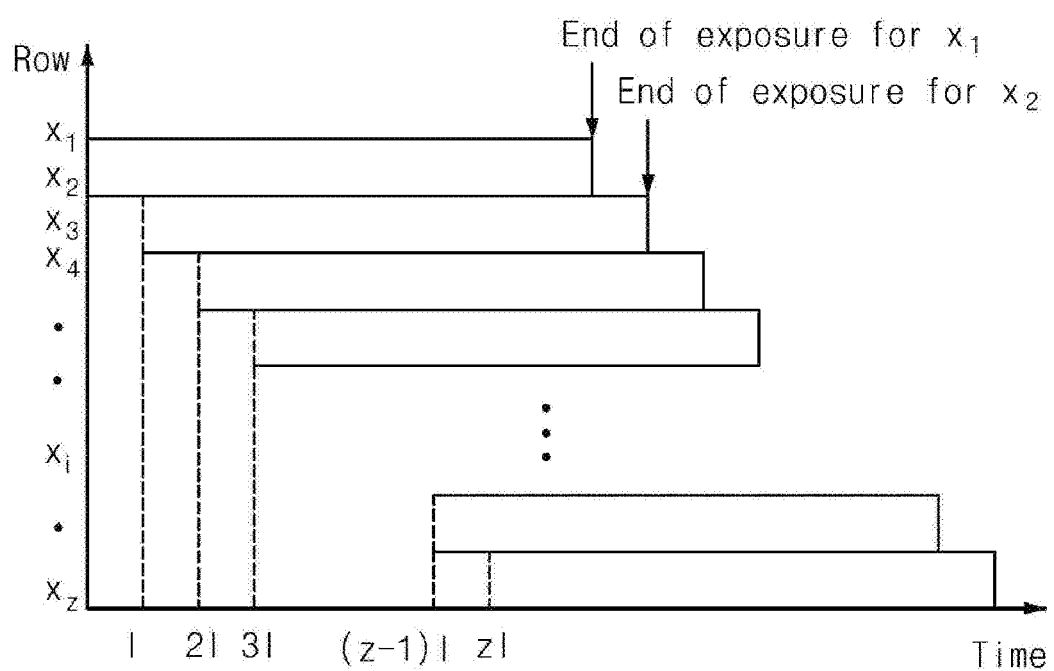

FIGS. 7A to 7C illustrate a method of calculating a vertical flow velocity of a fluid in the rolling shutter method of an optical sensor according to an embodiment of the present invention.

Referring to FIGS. 7A to 7C, the optical sensor package module 400 may use the rolling shutter method, and the fluidic flow may move in a vertical direction (i.e., a x-axis direction) in the flow channel. In other words, a movement direction of the shutter may be the same as or opposite to the flow direction of the fluid.

According to the rolling shutter method, as described above, the regular time interval l may be present between the time when exposure of one row is started and the time when exposure of the next row is started. In particular, when a fluid flow direction is the same as an exposure direction of the rolling shutter method as shown in the embodiment of FIG. 7A, the time interval l should be taken into consideration for flow velocity calculation.

In the rolling shutter method, a fluid velocity $V_{R-V\_j}$ of a vertical flow may be calculated by Equation 3 below.

$$S_{R-V\_j}[m] = (Q_{kj} - Q_{ij}) * p \qquad \text{[Equation 3]}$$

$$T_{R-V\_i}[s] = \frac{n-m}{FPS} + (Q_{kj} - Q_{ij}) * l$$

$$V_{R-V\_i}[m/s] = \frac{S_{R-V\_i}}{T_{R-V\_i}} = \frac{Q_{kj} - Q_{ij}}{\frac{n-m}{FPS} + (Q_{kj} - Q_{ij}) * l} * p$$

Here, $S_{R-V\_i}$ and $T_{R-V\_i}$ respectively indicate a travel distance and a travel time of the fluid, and units thereof are [m] and [s].

$Q_{ij}$ may be defined to be a position of a last pixel which exceeds the threshold value in the fluid flow direction in an $m^{th}$ frame (m>1) and may indicate a pixel corresponding to a $j^{th}$ column and an $i^{th}$ row.

Also, $Q_{kj}$ may be defined to be a position of a last pixel which exceeds the threshold value in the fluid flow direction in an $n^{th}$ frame (n>m) and may indicate a pixel corresponding to the $j^{th}$ column and a $k^{th}$ row (k>i).

P indicates the distance between pixels which are adjacent in the fluid flow direction, and FPS is a frame rate, that is, the number of frames per second. Also, l indicates the difference between times when exposure of adjacent rows is started.

Figure 9:
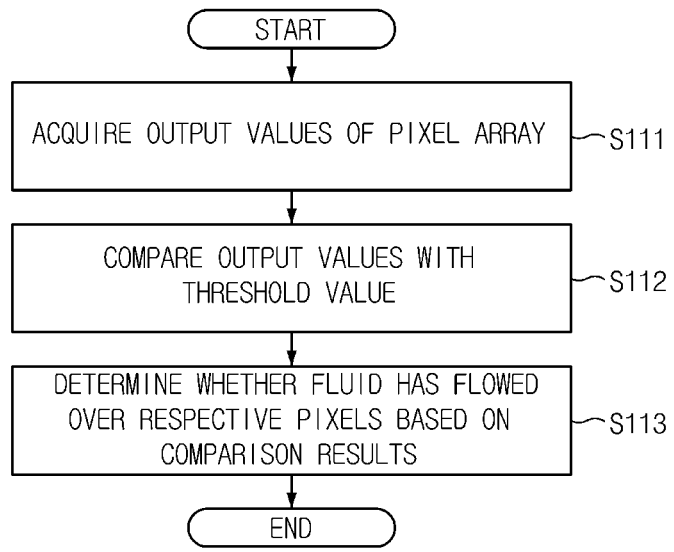
FIG. 9 is a flowchart illustrating a method of measuring a propagation profile of a fluid according to an embodiment of the present invention.
Figure 10:
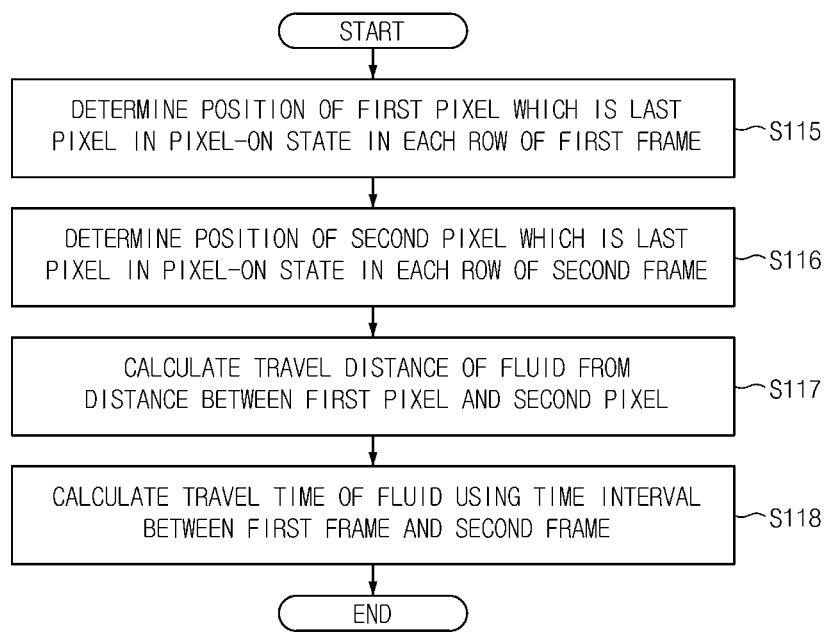
FIG. 10 is a flowchart illustrating a method of measuring a flow velocity of a fluid according to an embodiment of the present invention.

FIG. 8 is a flowchart illustrating a method of evaluating fluid flow characteristics of an optical sensor package module according to an embodiment of the present invention, FIG. 9 is a flowchart illustrating a method of measuring a propagation profile of a fluid according to an embodiment of the present invention, and FIG. 10 is a flowchart illustrating a method of measuring a flow velocity of a fluid according to an embodiment of the present invention.

Referring to FIG. 8, to evaluate fluid flow characteristics of the optical sensor package module 400, the computing device 200 may first measure a propagation profile and a flow velocity of a fluid in an initial state flow of the fluid in the flow channel 430 (S110).

Referring to FIG. 9, to measure a propagation profile of the fluid, the computing device 200 first acquires output values output from the pixel array 412 of the optical sensor package module (S111). The output values may be obtained by sensing light generated from a fluorescent material included in the fluid present on respective pixels and converting the sensed light into electrical signals.

The output values may be all pixel output values of the pixel array 412 at a specific frame and may be obtained from at least three frames, for example, in the beginning step, the intermediate step, and the final step of the initial state flow.

Next, the computing device 200 may compare the output values of the respective pixels with a preset threshold value (S112) and determine whether the fluid has flowed over the respective pixels (S113).

For example, when an output value of each pixel exceeds the threshold value, the computing device 200 may determine that the fluid has flowed over the corresponding pixel. On the other hand, when an output value is smaller than the threshold value, the computing device 200 may determine that the fluid has not reached the corresponding pixel.

Through this process, the computing device 200 may generate a propagation profile by distinguishably displaying pixels having output values which exceed the threshold value and other pixels.

Referring to FIG. 10, a flow velocity of a fluid may be measured on the basis of pixel output values measured in at least two frames.

First, the computing device 200 reads output values of all the pixels at a first frame and determines a position of a first pixel which is a last pixel in the pixel-on state in each row of the pixel array (S115).

Subsequently, the computing device 200 reads output values of all the pixels again at a second frame subsequent to the first frame and determines a position of a second pixel which is a last pixel in the pixel-on state in each row of the pixel array (S116).

When the positions of the first pixel and the second pixel are determined, it is possible to calculate a travel distance of the fluid by calculating the distance between the two pixels using the number of pixels between the first pixel and the second pixel and a predefined pitch between adjacent pixels (S117).

Also, it is possible to calculate a travel time of the fluid by calculating a time interval between the first frame and the second frame using the number of frames between the first frame and the second frame and a frame rate (fps) (S118).

The computing device 200 may calculate an average velocity or an instantaneous velocity of the fluidic flow in all frames from the calculated travel distance and travel time of the fluid.

Meanwhile, the optical sensor 410 may use the global shutter method or the rolling shutter method as an electronic shutter method. In particular, according to the rolling shutter method, the pixel array 412 may be sequentially exposed in units of rows, and a flow direction of the fluid may be the same as an exposure direction of the shutter. In this case, it is necessary to additionally consider a line time in calculating the travel time of the fluid in step S118.

Referring back to FIG. 8, when a propagation profile and a flow velocity of the fluid are measured in an initial state flow, the computing device 200 may calculate a first statistical parameter from the measured propagation profile and flow velocity of the fluid (S120). Here, the first statistical parameter indicates a boxplot which visually depicts a statistical value data group, a C.V which represents a ratio of the mean of the standard deviation, or the like.

In particular, the boxplot of the propagation profile may provide statistical information, such as a maximum, a minimum, a median, and first and third quartiles, of distances that the fluid travels in respective rows of the pixel array 412.

When the first statistical parameter is calculated, the computing device 200 may compare the first statistical parameter with a preset reference value and evaluate quality of the optical sensor package module according to the comparison result (S130). The reference value may be a specific statistical parameter as a requirement set by the manufacturer of the optical sensor package module for product quality guarantee.

For example, the manufacturer may select only products with a C.V value of 10% or less and exclude products which do not meet the requirement from the next evaluation. Also, the manufacturer may use a difference between the maximum and the minimum in the boxplot, a difference between the first quartile and the third quartile, or the like as a requirement for quality evaluation. For example, when the difference between the minimum and the maximum exceeds a set value, the corresponding product may be determined not to satisfy a quality evaluation.

In a quality evaluation step, the propagation profile may provide a reference for uniformity of the fluidic flow, and velocity distribution may provide a reference for stability of the fluidic flow.

When the initial state flow of the fluid reaches a last column of the pixel array 412, the fluidic flow in the flow channel becomes a stable state. In other words, output values measured from the pixel array 412 are barely changed, and the flow in such a state may be referred to as the normal state flow.

In the normal state flow, unlike the initial state flow in which it is determined whether the fluid has flowed over the respective pixels, the computing device 200 collects output values of the respective pixels in every frame and calculates a second statistical parameter, such as a boxplot or a C.V, from the collected output values (S140 and S150).

While the normal state flow of the fluid appears to be stable and unchanged in a broad view, output values of the respective pixels are continuously changed in a narrow view. Therefore, it is necessary to continuously monitor light intensities of all the pixels for a certain time period.

The second statistical parameter calculated in operation S150 may be used to additionally evaluate the optical sensor package module 400. For example, after a normal state is measured by sampling some optical sensor package modules from one lot, a second statistical parameter may be used to correct a normal state of another sample in the same lot or may be considered as a characteristic of the lot.

Meanwhile, since the optical sensor package module may be affected by the fixed matrix characteristic of the flow channel, such a factor should be taken into consideration for a planarization correction of a non-uniform flow system. A planarization correction may be performed using output values of the respective pixels and/or the second statistical parameter.

For a correction for planarization, a reference pixel for correction may be determined in the pixel array. For example, the reference pixel may be a pixel having the smallest difference between a first quartile and a third quartile.

When the reference pixel is determined, it is necessary to generate a lookup table for a planarization correction at each pixel regarding a representative value. For example, the representative value may be a mean, a median, a mode, or the like.

The lookup table for a planarization correction of each pixel may be filled with variables or functions for adjusting a representative value of each pixel with a representative value of the reference pixel, and the flow system may be corrected for planarization using the lookup table.

Although the present invention has been described with reference to embodiments shown in the drawings, the embodiments are merely exemplary, and those of ordinary skill in the art shall appreciate that various modifications and equivalents can be made from the embodiments. Accordingly, the true technical scope of the present invention should be determined by the technical spirit of the following claims.

DESCRIPTION OF REFERENCE SIGNS

100: measuring device
110: darkroom box
120: light source
130: sensor board
140: jig
200: computing device
300: cable
400: optical sensor package module
410: optical sensor
411: pixel unit
412: pixel array
414: pad
420: intermediate layer
430: flow channel
440: applied light source
450: darkroom capsule

What is claimed is:

1. A method of evaluating fluid flow characteristics of a lens-free complementary metal-oxide semiconductor (CMOS) optical sensor package module with a flow channel, the method comprising:
   measuring a propagation profile and a flow velocity in an initial state flow of a fluid in the flow channel;
   calculating a first statistical parameter relating to flow characteristics of the fluid from the measured propagation profile and flow velocity; and
   comparing the calculated first statistical parameter with a preset reference value and evaluating quality of the flow channel according to a comparison result.

2. The method of claim 1, wherein the measuring of the propagation profile comprises:
   acquiring output values from a pixel array of the optical sensor package module;
   comparing the output values with a set threshold value; and
   determining whether the fluid has flowed over respective pixels based on comparison results.

3. The method of claim 1, wherein the propagation profile is measured in each of a beginning step, an intermediate step, and a final step of the initial state flow.

4. The method of claim 3, wherein the beginning step is a point in time when output values of all pixels in a first column of a pixel array exceed a set threshold value.

5. The method of claim 3, wherein the final step is a point in time when an output value of at least one pixel in a last column of a pixel array exceeds a set threshold value.

6. The method of claim 1, wherein the measuring of the flow velocity comprises:

determining a position of a first pixel which is a last pixel in a pixel-on state in each row of a first frame;

determining a position of a second pixel which is a last pixel in a pixel-on state in each row of a second frame subsequent to the first frame;

calculating a travel distance of the fluid from a distance between the first pixel and the second pixel; and calculating a travel time of the fluid using a time period between the first frame and the second frame.

7. The method of claim 6, wherein the flow velocity VG is calculated by equations below:

$$S_{G\_i}[m] = (Q_{ik} - Q_{ij}) * p$$

$$T_{G\_i}[s] = \frac{n-m}{FPS}$$

$$V_{G\_i}[m/s] = \frac{S_{G\_i}}{T_{G\_i}} = \frac{Q_{ik} - Q_{ij}}{n-m} * p * FPS$$

where $S_{G\_i}$ and $T_{G\_i}$ respectively indicate the travel distance and the travel time of the fluid, $Q_{ij}$ indicates a position of a last pixel which exceeds a threshold value in a fluid flow direction in an $m^{th}$ frame (m>1), and $Q_{ik}$ indicates a position of a last pixel which exceeds the threshold value in the fluid flow direction in an $n^{th}$ frame (n>m), and p indicates a distance between pixels which are adjacent in the fluid flow direction, and FPS indicates a number of frames per second.

8. The method of claim 6, wherein when the optical sensor uses a rolling shutter method and an exposure direction of the shutter is the same as or opposite to a flow direction of the fluid, the travel time of the fluid is calculated by considering a line time in addition to the time period between the first frame and the second frame.

9. The method of claim 8, wherein the flow velocity $V_{R-V\_j}$ is calculated by equations below:

$$S_{R-V\_i}[m] = (Q_{kj} - Q_{ij}) * p$$

$$T_{R-V\_i}[s] = \frac{n-m}{FPS} + (Q_{kj} - Q_{ij}) * l$$

$$V_{R-V\_i}[m/s] = \frac{S_{R-V\_i}}{T_{R-V\_i}} = \frac{Q_{kj} - Q_{ij}}{\frac{n-m}{FPS} + (Q_{kj} - Q_{ij}) * l} * p$$

where $S_{R-V\_i}$, and $T_{R-V\_i}$, respectively indicate the travel distance and the travel time of the fluid, $Q_{ij}$ indicates a position of a last pixel which exceeds a threshold value in a fluid flow direction in an $m^{th}$ frame (m>1), $Q_{kj}$ indicates a position of a last pixel which exceeds the threshold value in the fluid flow direction in an $n^{th}$ frame (n>m), and P indicates a distance between pixels which are adjacent in the fluid flow direction, FPS indicates a number of frames per second, and l indicates a difference between times when exposure of adjacent rows is started.

10. The method of claim 1, wherein the first statistical parameter includes at least one of a coefficient of variation and a boxplot, and the evaluating of the quality of the flow channel comprises determining that a quality requirement is satisfied when the coefficient of variation is smaller than a set first value or a difference between a maximum and a minimum of the boxplot is smaller than a set second value.

11. The method of claim 1, further comprising:

acquiring output values of respective pixels in a valid area of the optical sensor in a normal state flow of the fluid; and calculating a second statistical parameter from the output values.

12. The method of claim 11, further comprising performing a correction for planarization based on the output values or the second statistical parameter.

* * * * *